United States Patent
Lee et al.

(10) Patent No.: US 8,379,561 B2
(45) Date of Patent: Feb. 19, 2013

(54) MULTIPLE RELAY BASED MULTIPLE INPUT MULTIPLE OUTPUT COMMUNICATION SYSTEM

(75) Inventors: Namyoon Lee, Daejeon-si (KR); Young-Doo Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 966 days.

(21) Appl. No.: 12/432,417

(22) Filed: Apr. 29, 2009

(65) Prior Publication Data

US 2010/0110968 A1    May 6, 2010

(30) Foreign Application Priority Data

Nov. 3, 2008    (KR) .................. 10-2008-0108394

(51) Int. Cl.
*H04L 12/56* (2006.01)
*H04J 1/16* (2006.01)

(52) U.S. Cl. ........ 370/315; 370/252; 370/278; 370/329; 370/442

(58) Field of Classification Search ............. 370/252, 370/278, 315, 329, 442
See application file for complete search history.

(56) References Cited

U.S. PATENT DOCUMENTS

| 2006/0252367 A1 | 11/2006 | Haartsen |  |
|---|---|---|---|
| 2010/0202343 A1* | 8/2010 | Hunzinger et al. | 370/315 |
| 2011/0235556 A1* | 9/2011 | Zheng et al. | 370/280 |

FOREIGN PATENT DOCUMENTS

| JP | 2007-74304 | 3/2007 |
| KR | 2006-124401 | 12/2006 |
| KR | 2007-68825 | 7/2007 |
| KR | 2007-73081 | 7/2007 |
| KR | 2007-77527 | 7/2007 |
| KR | 2008-20241 | 3/2008 |
| KR | 2008-52131 | 6/2008 |

* cited by examiner

*Primary Examiner* — John Pezzlo
(74) *Attorney, Agent, or Firm* — NSIP Law

(57) ABSTRACT

A base station with multiple antennas including a relay scheduler to select a serving relay from a plurality of candidate relays. Each candidate relay may have a user group including at least one user. The selection may be based on an achievable transmission capacity of each candidate relay with respect to its user group and a state of channels formed between the plurality of candidate relays and the base station. The base station also includes a transmission signal generator to generate a transmission signal for the user group corresponding to the serving relay.

20 Claims, 8 Drawing Sheets

MULTIPLE RELAY BASED MULTIPLE INPUT MULTIPLE OUTPUT COMMUNICATION SYSTEM

CROSS-REFERENCE TO RELATED APPLICATION

This application claims the benefit under 35 U.S.C. §119 (a) of a Korean Patent Application No. 10-2008-0108394, filed on Nov. 3, 2008, in the Korean Intellectual Property Office, the entire disclosure of which is incorporated herein by reference.

BACKGROUND

1. Field

The following description relates to a multi-relay based Multiple Input Multiple Output (MIMO) communication system. More particularly, this description relates to enhanced total throughput of a MIMO communication systems.

2. Description of the Related Art

Technology associated with a MIMO communication system using multiple channels in a spatial domain is quickly developing.

In a MIMO communication system, a base station may simultaneously transmit data streams to a plurality of users using a spatial division multiplexing access (SDMA) scheme. The SDMA scheme denotes a scheme that may simultaneously transmit at least one data stream to at least one user using multiple antennas.

Many communication systems may solve a problem caused by shadow regions and use relays to expand cell coverage. In particular multi-relay based MIMO communication system including a plurality of relays is recently in the spotlight. In the multi-relay based MIMO communication system, a base station may transmit data to the plurality of relays in a first time slot. In a second time slot, each of the relays may transmit a relay signal to users that is generated based on the transmitted data.

SUMMARY

In one general aspect, a base station including multiple antennas includes a relay scheduler to select a serving relay from a plurality of candidate relays, each candidate relay having a user group including at least one user, where the selection is based on an achievable transmission capacity of each candidate relay with respect to its user group and a state of channels formed between the plurality of candidate relays and the base station; and a transmission signal generator to generate a transmission signal for the user group corresponding to the serving relay.

The relay scheduler may select the serving relay based on inter-relay interference (IRI) occurring in the user group of each candidate relay due to the plurality of candidate relays. The selection of the serving relay may be based on a prediction of a state of effective channels formed between the plurality of candidate relays and the base station based on the state of channels formed between the plurality of candidate relays and the base station. The selection of the serving relay may be based on an achievable transmission capacity of the base station with respect to the plurality of candidate relays and the predicated state of the effective channels.

The relay scheduler may predict a total transmission capacity corresponding to the serving relay based on a lesser value between an achievable transmission capacity of the base station with respect to the serving relay and a transmission capacity of the serving relay with respect to its user group, and the relay scheduler may select the serving relay that maximizes a system capacity, where the system capacity is a sum of total transmission capacities corresponding to the serving relay. The relay scheduler also may predicts the state of effective channels, based on the state of channels formed between the plurality of candidate relays and the base station, and the relay scheduler may generate a precoder.

The relay scheduler may selects the serving relay by constructing a plurality of subsets from the plurality of candidate relays and selects any one subset from the plurality of subsets to thereby select the serving relay. The relay scheduler also may select the serving relay by constructing a plurality of subsets from the plurality of candidate relays, groups the plurality of subsets based on locations of candidate relays, and each of the subsets comprises the same single relay. The relay scheduler also may select the serving relay by constructing a plurality of subsets from the plurality of candidate relays and selects any one subset from the plurality of subsets based on an achievable transmission capacity of the base station with respect to candidate relays belonging to the plurality of subsets and an achievable transmission capacity of each candidate relay belonging to the plurality of subsets and its user group.

The transmission signal may be transmitted to the serving relay in a first time slot and the a relay signal associated with the transmission signal is configured to be transmitted to the user group of each candidate relay in a second time slot different from the first time slot.

Each candidate relay may select the user based on its achievable transmission capacity to construct its user group.

The transmission signal generator may generate the transmission signal with respect to the serving relay according to a spatial division multiplexing access (SDMA) scheme. The transmission signal generator also may generates the transmission signal according to a zero-forcing beamforming scheme.

The base station may further include an information receiver to receive first information associated with the transmission capacity of each candidate relay and second information associated with a state of channels formed between the plurality of candidate relays and the base station.

In another general aspect, a relay includes a user selector to select a user from a plurality of users; an information transceiver to transmit, to a base station, information associated with an achievable transmission capacity of with respect to the selected user and channel state information associated with a channel formed between the base station and the relay, and to receive information associated with at least one serving relay; and a relay signal transmitter to transmit a relay signal to the selected user when the relay is selected as the at least one serving relay by the base station, wherein the relay is selected as the serving relay from a plurality of candidate relays, based on an achievable transmission capacity of each candidate relay with respect to its user group and a state of channels formed between the plurality of candidate relays and the base station, and the user group of each candidate relay includes the user.

The user selector may select the user based on a state of channels formed between the relay and the plurality of users.

The relay signal transmitter may transmit the relay signal according to an SDMA scheme.

A state of effective channels may be formed between the plurality of candidate relays and the base station is predicted based on the state of channels formed between the plurality of candidate relays and the base station and the relay may be selected as the at least one serving relay based on the predicted state of effective channels.

In another general aspect, a method of operating a base station including multiple antennas includes selecting at least one serving relay from a plurality of candidate relays, each candidate relay having a user group including at least one user, based on an achievable transmission capacity of each candidate relay with respect to at least one user group and a state of channels formed between the plurality of candidate relays and the base station; and generating a transmission signal for the user group corresponding to the at least one serving relay.

In another general aspect, a computer-readable storage medium storing a program to perform a method of operating a base station, comprising instructions to cause a computer to: select at least one serving relay from a plurality of candidate relays, each candidate relay having a user group including at least one user, based on an achievable transmission capacity of each candidate relay with respect to at least one user group and a state of channels formed between the plurality of candidate relays and the base station; and generate a transmission signal for the user group corresponding to the at least one serving relay.

Other features and aspects will be apparent from the following description, drawings, and claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity and convenience.

DETAILED DESCRIPTION

The following detailed description is provided to assist the reader in gaining a comprehensive understanding of the media, apparatuses, methods and systems described herein. Accordingly, various changes, modifications, and equivalents of the media, apparatuses, methods and/or systems described herein will be suggested to those of ordinary skill in the art. Also, descriptions of well-known functions and constructions may be omitted for increased clarity and conciseness.

Figure 1:
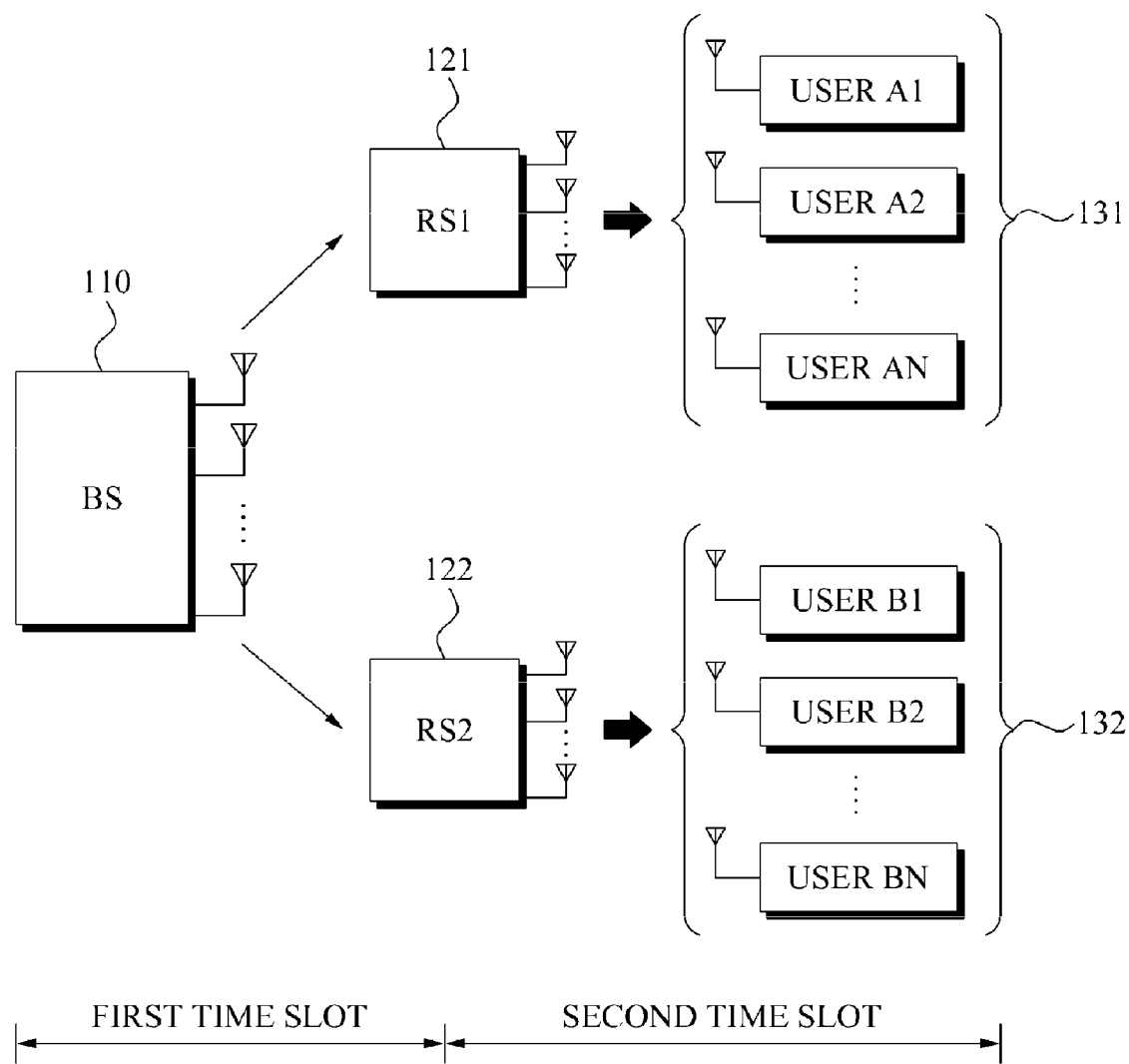
FIG. 1 is a diagram illustrating an exemplary multi-relay based multi-user Multiple Input Multiple Output (MIMO) communication system.

FIG. 1 shows an exemplary multi-relay based multi-user MIMO communication system. A base station (BS) 110 may transmit a transmission signal to a plurality of relays (RS) RS1 121 and RS2 122 in a first time slot. For example, the BS 110 may simultaneously support RS1 121 and RS2 122 according to an SDMA scheme.

The BS 110 may generate a precoder, for example, a preceding matrix based on a state of channels formed between the BS 110 and the plurality of relays such as RS1 121 and RS2 122. The BS 110 may perform beamforming for data streams for RS1 121 and RS2 122 according to the SDMS scheme, using the generated precoder.

RS1 121 and RS2 122 may transmit relay signals to user groups 131 and 132, respectively, in a second time slot. RS1 121 and RS2 122 may transmit the relay signals to a plurality of users according to the SDMA scheme. The relay signals may be generated based on the transmission signal received in the first time slot. Users belonging to the user groups 131 and 132 may be selected according to a greedy user selection algorithm and the like.

For example, RS1 121 and RS2 122 may generate the relay signals according to a decode-and-forward scheme or an amplify-and-forward scheme, based on the transmission signal of the BS 110 received in the first time slot. RS1 121 may generate a precoder based on a state of channels formed between RS1 121 and users (e.g., user A1 user A2, . . . , user AN) of the user group 131, and generate its relay signal using the generated precoder. RS2 122 may also generate a precoder based on a state of channels formed between RS2 122 and users (e.g., user B1, user B2, . . . , user BN) of the user group 132, and generate its relay signal using the generated precoder.

Where the BS 110 selects, as serving relays, the RS1 121 and RS2 122 from a plurality of relays, the BS 110 may consider a state of channels formed between the BS 110 and the plurality of relays and also may consider an achievable transmission capacity of each of the relays with respect to the user groups 131 and 132. Here, the serving relays RS1 121 and RS2 122 denote relays that may transmit the relay signals to the user groups 131 and 132 in a second time slot. For example, the BS 110 may select the serving relays RS1 121 and RS2 122 based on the state of channels formed between the plurality of relays and the achievable transmission capacity of each of the relays with respect to the user groups 131 and 132. Accordingly, a system capacity may be enhanced.

Figure 2:
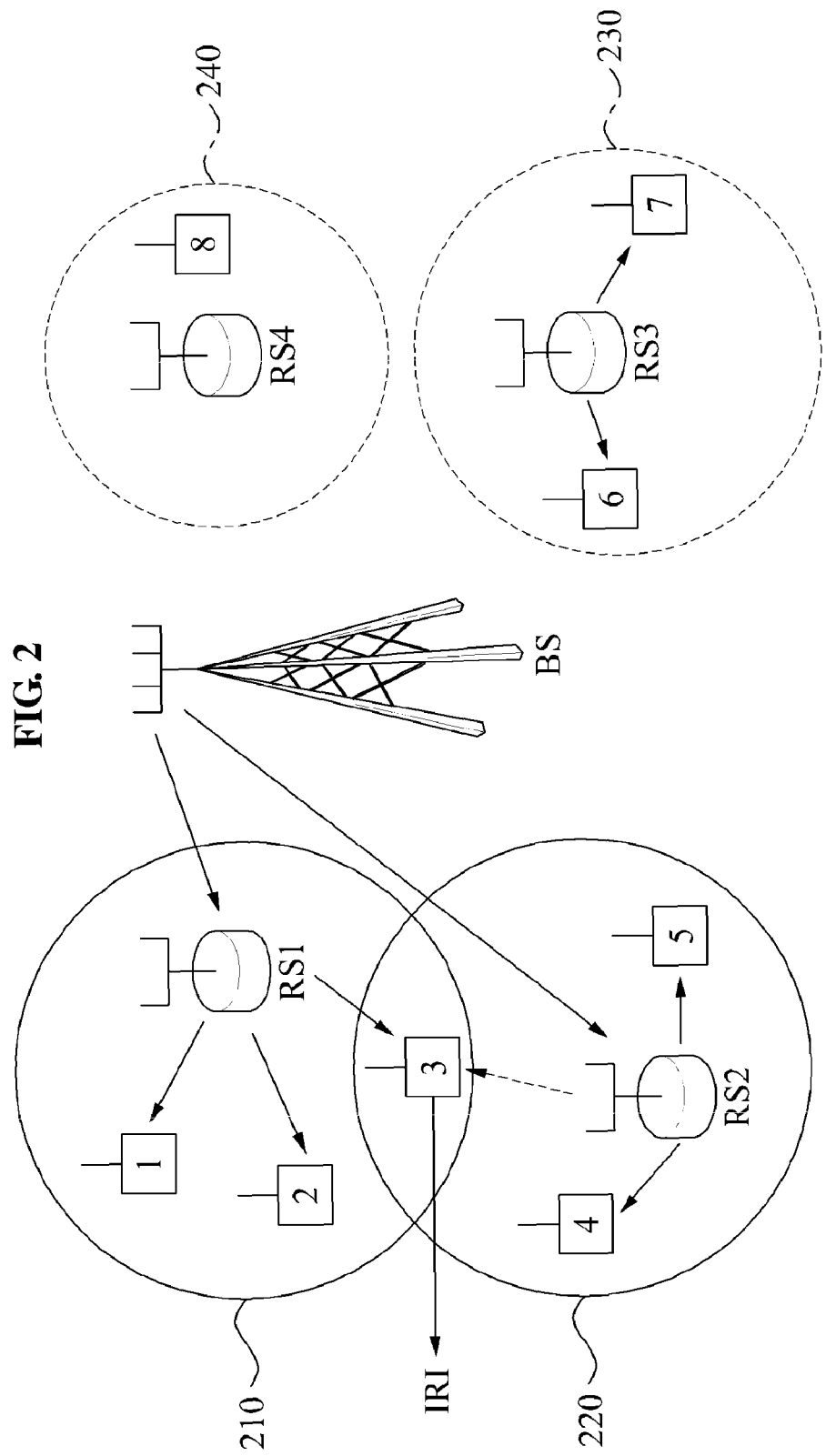
FIG. 2 is a diagram illustrating an exemplary multi-relay based multi-user MIMO communication system where two relays are selected as serving relays.

FIG. 2 illustrates an exemplary multi-relay based multi-user MIMO communication system where RS1 and RS2 are selected as serving relays. The multi-relay based multi-user MIMO communication system may include a base station (BS) and a plurality of relays (e.g., RS1, RS2, RS3, RS4). Each of the relays (RS1, RS2, RS3, RS4) may have a user group including at least one user. For example, RS1 may have a user group 210 including users 1, 2, and 3; RS2 may have a user group 220 including users 4 and 5; RS3 may have a user group 230 including users 6 and 7; and RS4 may have a user group 240 including a user 8.

Here, it is assumed that the BS selects RS1 and RS2 from RS1, RS2, RS3, and RS4 as the serving relays. In this case, since the user 3 belongs to the user group 210, the user 3 may need to receive only a relay signal of RS1, but the user 3 also may receive a relay signal of RS2. The relay signal of RS2 may interfere with the reception of the user 3. This interference may have a negative effect on the entire communication system. Interference occurring where a user of any one user group receives a relay signal of a relay corresponding to another user group may be referred to as inter-relay interference (IRI).

According to the description herein, a base station may appropriately select serving relays so that a total throughput of a communication system may be enhanced and prevent deterioration of throughput of the communication system due to IRI and the like. In this case, the base station may select the serving relays based on a distance between a plurality of candidate relays to thereby reduce the IRI.

Figure 3:
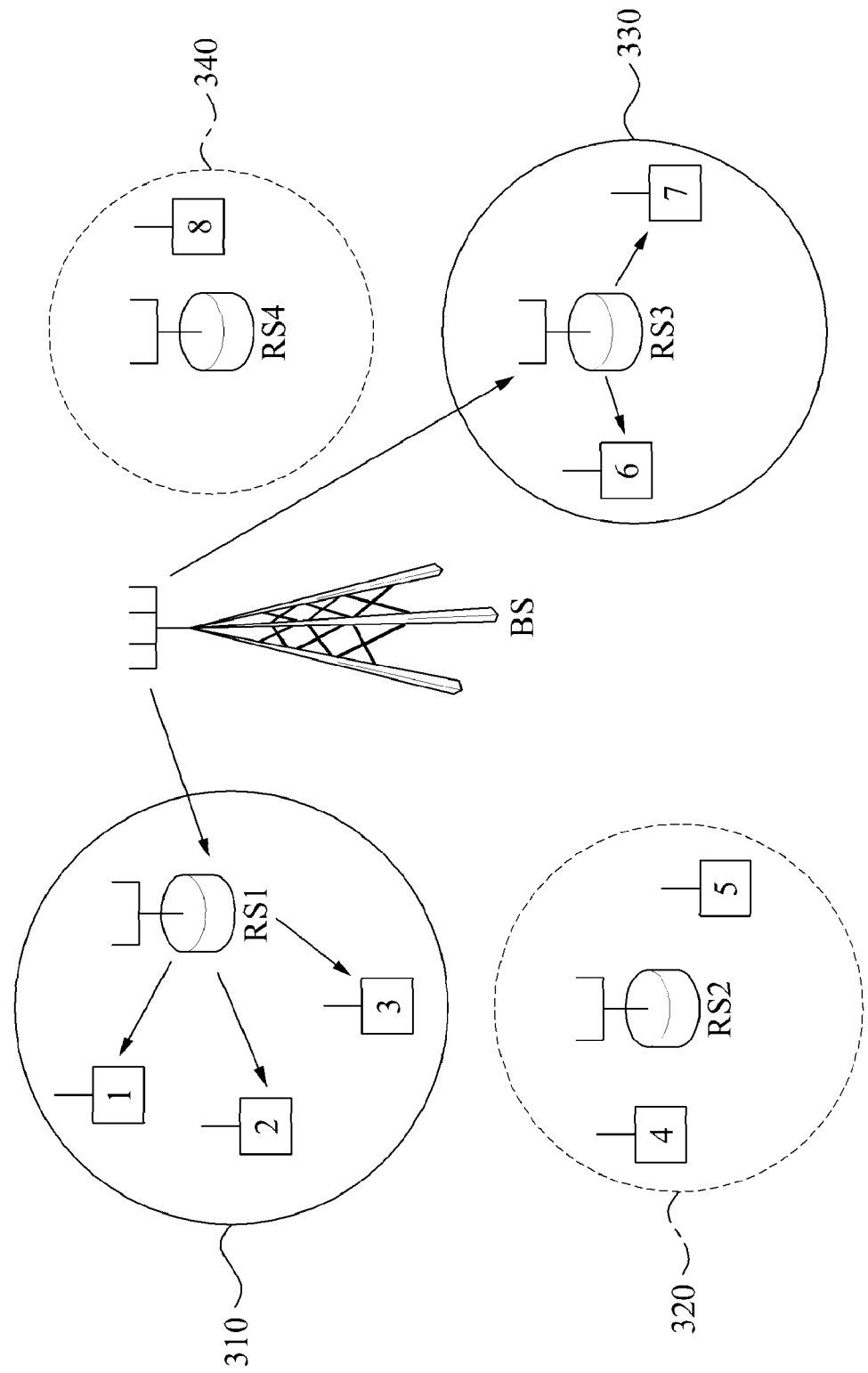
FIG. 3 is a diagram illustrating another exemplary multi-relay based multi-user MIMO communication system where two relays are selected as serving relays.

FIG. 3 illustrates an exemplary multi-relay based multi-user MIMO communication system where RS1 and RS3 are selected as serving relays. The multi-relay based multi-user MIMO communication system may include a base station (BS) and a plurality of relays (RS1, RS2, RS3, RS4). Each of the relays (RS1, RS2, RS3, RS4) may have a user group including at least one user.

For example, RS1 may have a user group 310 including users 1, 2, and 3; RS2 may have a user group 320 including users 4 and 5; RS3 may have a user group 330 including users 6 and 7; and RS4 may have a user group 340 including a user 8. Here, assume that RS1 and RS3 are selected as the serving relays from among RS1, RS2, RS3, and RS4.

In a first time slot, the BS may perform beamforming for data streams for RS1 and RS3 according to an SDMA scheme to thereby generate a transmission signal and may transmit the generated transmission signal to RS1 and RS3.

In a second time slot, RS1 and RS3 may transmit relay signals for user groups 310 and 330. For example, in the second time slot, users 1, 2, and 3, belonging to the user group 310, may receive the relay signal of RS1, and users 5 and 7, belonging to the user group 330, may receive the relay signal of RS3. Other user groups 320 and 340 may not receive any effective signal in the second time slot.

Since the user group 310 is spaced apart from the user group 330 as shown in FIG. 3, it may be predicted that minimal IRI may occur between RS1 and the user group 330 and between RS3 and the user group 310.

In the multi-relay based multi-user MIMO communication system, a transmission signal of a base station, a received signal and a relay signal of a relay, and a received signal of a user may be modeled as follows.

The transmission signal x of the base station may be expressed by the following Equation 1:

$$x = \sum_{l=1}^{\hat{k}} F_l s_l.$$

Here, F denotes a precoder, for example, a preceding matrix, s denotes a data stream, l denotes an index of the data stream, $E[F_l F_l^H]=I$, and $$E[s_l s_l^H] = \frac{P_s}{M_{RS,l}} I.$$

$P_s$ denotes a transmission power of the base station and $M_{RS,l}$ denotes a number of antennas at an $l^{th}$ serving relay.

A received signal $r_k$ of a $k^{th}$ serving relay may be expressed by the following Equation 2:

$$r_k = H_k x + n_k.$$

Here, $H_k$ denotes a channel matrix between the base station and the $k^{th}$ serving relay, and $n_k$ denotes a noise vector of the $k^{th}$ serving relay.

The above Equation 2 also may be expressed by the following Equation 3:

$$r_k = H_k F_k s_k + \sum_{l \ne k}^{\hat{k}} H_k F_l s_l + n_k.$$

Where the base station generates the precoder F to satisfy a condition of the following Equation 4, it is possible to cancel interference $$\sum_{l \ne k}^{\hat{k}} H_k F_l s_l$$

in the $k^{th}$ serving relay caused by data streams for other serving relays.

$$H_k F_l = 0, \forall l \ne k. \quad \text{Equation 4}$$

Here, $\overline{H}_k = H_k F_k$ denotes an effective channel. The above Equation 4 also may be expressed by the following Equation 5:

$$r_k = H_k F_k s_k + n_k = \overline{H}_k s_k + n_k.$$

A transmission capacity of the base station with respect to $\hat{K}$ serving relays in the first time slot may be expressed by the following Equation 6:

$$I_1(\overline{H}) = \sum_{k=1}^{\hat{k}} I_1(\overline{H}_k) = \sum_{k=1}^{\hat{k}} \log_2 \left\{ \det\left(I + \frac{P_s}{M} \overline{H}_k Q_k \overline{H}_k^H \right) \right\}$$

Here, $Q_k$ denotes an input power loading matrix, M denotes a number of antennas at the base station, and $P_s$ denotes the transmission power of the base station.

Each of the serving relays may receive the transmission signal of the base station and generate a relay signal by decoding and re-encoding the received signal, and transmit the relay signal to a user group in the second time slot. Here, a received signal of a $j^{th}$ user group with respect to a relay signal of a $k^{th}$ serving relay may be expressed by the following Equation 7:

$$y_{jk} = G_{jk} W_{jk} s_k + \sum_{i=1, i \ne k}^{\hat{k}-1} G_{ji} W_{ji} s_i + z_{ji}.$$

Here, $W_{jk}$ denotes a precoder used at the $k^{th}$ serving relay for the $j^{th}$ user group. A inter-user interference (IUI) may be cancelled due to $W_{jk}$. $G_{jk}$ denotes a channel matrix between the $k^{th}$ serving relay and the $j^{th}$ user group, and $z_{ji}$ denotes a noise vector.

$$\sum_{i=1, i \ne k}^{\hat{k}-1} G_{ji} W_{ji} s_i$$

denotes the IRI that may occur in the $j^{th}$ user group corresponding to the $k^{th}$ serving relay due to other serving relays excluding the $k^{th}$ serving relay.

The achievable transmission capacity of the $k^{th}$ serving relay with respect to the $j^{th}$ user group in the second time slot may be expressed by the following Equation 8:

$$I_2(G_{jk}) = \sum_{j=1}^{M_{RS,k}} \log_2(1 + SINR_{jk})$$

$$SINR_{jk} = \frac{|w_{jk}^H g_{jk}|^2 \frac{P_r}{M}}{\underbrace{\sum_{j\neq k, j=1} |w_{jk}^H g_{jk}|^2 \frac{P_r}{M}}_{|U|} + \underbrace{\sum_{l=1, j\neq k} \sum_{j=1} |w_{jl}^H g_{jl}|^2 \frac{P_r}{M}}_{|R|} + \sigma^2}$$

Here, $M_{RS,k}$ denotes a number of antennas at the $k^{th}$ serving relay, $P_r$ denotes a transmission power of a serving relay, M denotes a number of antennas at the serving relay, and $\sigma^2$ denotes a variance of noise.

Referring to the above Equation 8, the IUI may be cancelled by appropriately designing W, whereas the IRI may be cancelled by appropriately selecting the serving relays from a plurality of candidate relays. The base station may select the serving relays by considering the IRI and also, so that a total throughput of a communication system may be enhanced. For example, the base station may select the serving relays so that the total throughput of the communication may be enhanced in the first time slot and the second time slot, instead of selecting the serving relays by considering the transmission capacity of the base station in the first time slot and by considering the transmission power of each of the relays in the second time slot.

Operation of Candidate Relays and Base Station

Figure 4:
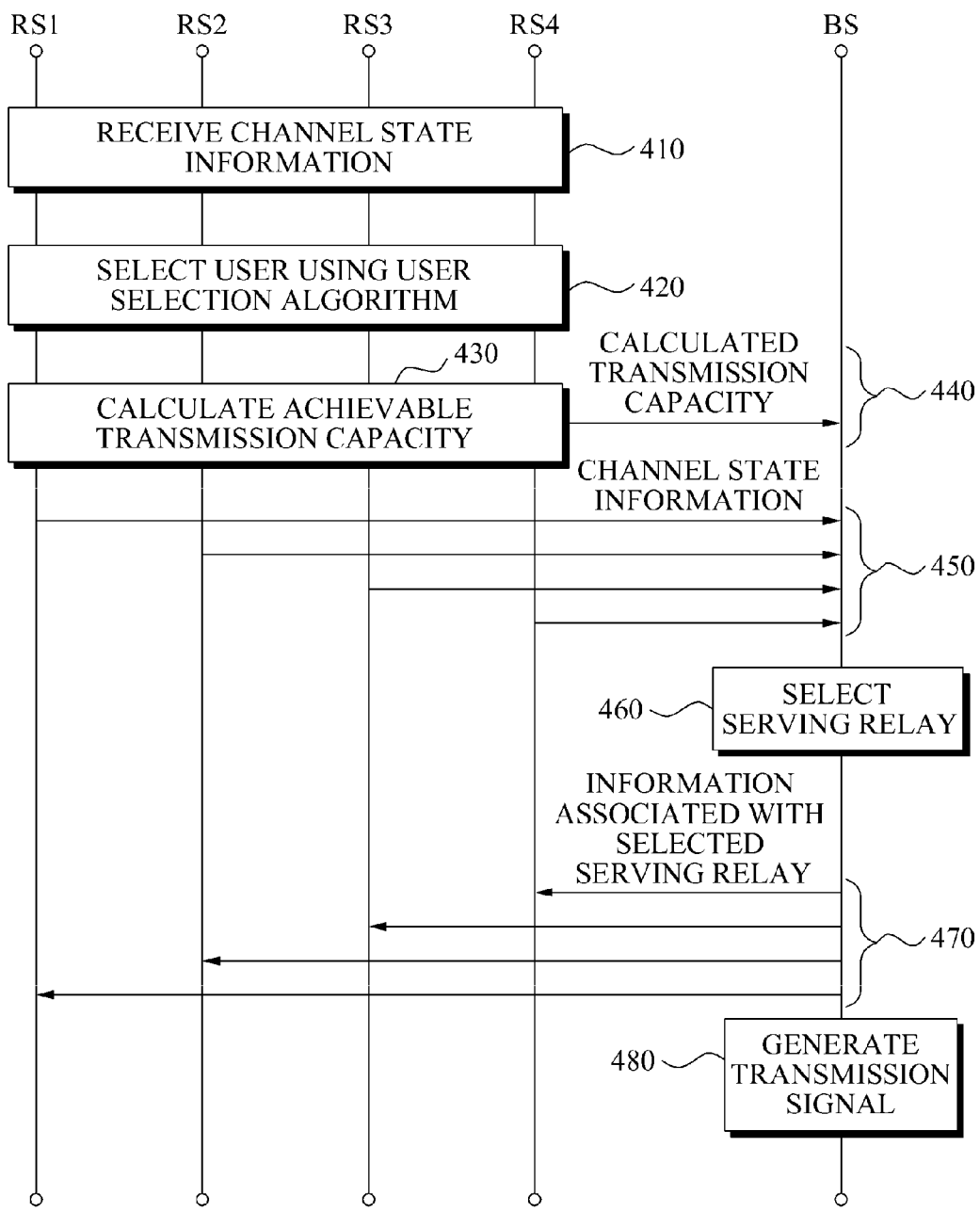
FIG. 4 is a flowchart illustrating an exemplary method of operating candidate relays and a base station.

FIG. 4 illustrates an exemplary operating method of candidate relays and a base station.

Referring to FIG. 4, each of a plurality of candidate relays (RS1, RS2, RS3, RS4) may receive, from users, channel state information associated with channels formed between the users and the plurality of the candidate relays RS1, RS2, RS3, and RS4 (410). The channel state information may include channel direction information and channel quality information.

Each of the candidate relays RS1, RS2, RS3, and RS4 may select at least one user using a predetermined user selection algorithm, for example, a greedy user selection algorithm and the like, to generate a user group (420).

Each of the candidate relays RS1, RS2, RS3, and RS4 may perform beamforming for the selected at least one user belonging to the user group to calculate an achievable transmission capacity (430).

Each of the candidate relays RS1, RS2, RS3, and RS4 may feed back to a BS the calculated transmission capacity (440). Each of the candidate relays RS1, RS2, RS3, and RS4 may feed back to the BS channel state information associated with the channel formed between each of the candidate relays RS1, RS2, RS3, and RS4 and the BS (450).

The BS may select at least one serving relay from the plurality of candidate relays RS1, RS2, RS3, and RS4 according to a serving relay selection algorithm (460).

The BS may provide the plurality of candidate relays RS1, RS2, RS3, and RS4 with information associated with the selected at least one serving relay (470). The BS may transmit a transmission signal generated for the at least one serving relay in a first time slot (480).

Although not illustrated in FIG. 4, each of the at least one serving relays may generate a relay signal based on the transmission signal of the base station and transmit the relay signal to the user group in a second time slot.

Serving Relay Selection Algorithm

A base station may select at least one serving relay so that a system capacity may be enhanced. The base station may effectively reduce the complexity for selecting at least one serving relay. The system capacity may be a sum of the total transmission capacity corresponding to each of the at least one serving relays. For example, where a serving relay 1 and a serving relay 2 exist, the system capacity may be the sum of the total transmission capacity corresponding the serving relay 1 with respect to a path of the base station to the serving relay 1 to the user group and a total transmission capacity corresponding to the serving relay 2 with respect to a path of the base station to the serving relay 2 to the user group.

Assume that an initial set of indexes of K candidate relays is represented by $\Omega_0=\{1, 2, \ldots, K\}$. Where k is an element of $\Omega_0$, the base station may calculate a total transmission capacity of a path from the base station to the user group via a candidate relay according to the following Equation 9. In this case, the total transmission capacity of the path from the base station to the user group via the candidate relay may be limited by a smaller value between a transmission capacity of the base station with respect to the candidate relay and a transmission capacity of the candidate relay with respect to the user group. Equation 9 may be expressed as:

$$\forall k \tau_R(k) = \frac{1}{2}\min\{I_k^1, I_k^{ZF,2}\}, \quad (9)$$

where $$I_k^1 = \max_{Q_k} \log\left|I + \frac{1}{\sigma^2} H_k Q_k H_k^H\right|.$$

The base station may select an index $r_1 = \arg\max \tau_R(k)$ of a candidate relay of which the total transmission capacity, as calculated above with respect to equation 9, is a maximum. The selected index of the candidate relay may be assigned to a relay set $R_1$. Accordingly, $R_1=\{r_1\}$.

A set of indexes of candidate relays may be updated in order to inhibit IRI with respect to the selected candidate relay. For example, $\Omega_0$ may be updated to $\Omega_1 = \Omega_0 - \{r_1\} - \Upsilon_1$. Here, $\Upsilon_1$ denotes a set of indexes of candidate relays that may cause the IRI in the selected candidate relay (index $r_1$).

The base station may set a number of its serviceable candidate relays to $$\hat{K} = \left\lfloor \frac{\sum_{k=1} M_{RS,k}}{M_{BS}} \right\rfloor.$$

Here, $M_{BS}$ denotes a number of antennas at the base station and $M_{RS,k}$ denotes a number of antennas at a $k^{th}$ candidate relay.

The base station may generate $\overline{R}_m = R_{m-1} \cup \{k\}$ with respect to all the elements $k \in \Omega_{m-1}$ belonging to the set of indexes of candidate relays. Here, $\overline{R}_m$ denotes a set of candidate relays used for selecting the serving relays.

Where $l \in \overline{R}_m$, the base station may generate a precoder $F_1$ so that interference may be eliminated between candidate relays corresponding to indexes that are elements of $\overline{R}_m$. The base station may calculate an effective channel $\overline{H}_l = H_l F_l$ with respect to each of the candidate relays.

The base station may calculate a water-filling solution of the effective channel $\overline{H}_l = H_l F_l$ with respect to each of the candidate relays, using a singular value decomposition (SVD).

The base station may calculate a system capacity $$\tilde{\tau}_R(m) = \sum_{l=1}^{m} \frac{1}{2} \min\{I_l^1, I_l^{ZF,2}\}$$

with respect to all of $\overline{R}_m$. The system capacity may be a sum of total transmission capacities corresponding to the candidate relays.

The base station may retrieve a maximum value from the calculated system capacities and retrieve indexes of candidate relays corresponding to the retrieved maximum value using $r_m = \arg\max_{k \in \Omega_{m-1}} \tilde{\tau}R(m)$.

The base station may update $R_{m-1}$ to $R_m = R_{m-1} \cup \{r_m\}$ and may update $\Omega_{m-1}$ to $\Omega_m = \Omega_{m-1} - \{r_m\} - \tilde{\Gamma}_m$ using the retrieved indexes of candidate relays. Where m is $$\hat{K} = \left\lfloor \frac{\sum_{k=1}^{\hat{K}} M_{RS,k}}{M_{BS}} \right\rfloor,$$

the base station may terminate a corresponding algorithm. Otherwise, the base station may return to generating the set of candidate relays $\overline{R}_m$, as described above. Where m is $$\hat{K} = \left\lfloor \frac{\sum_{k=1}^{\hat{K}} M_{RS,k}}{M_{BS}} \right\rfloor,$$

the candidate relays corresponding to the elements of $R_m$ may be finally determined as the serving relays.

Figure 5A:
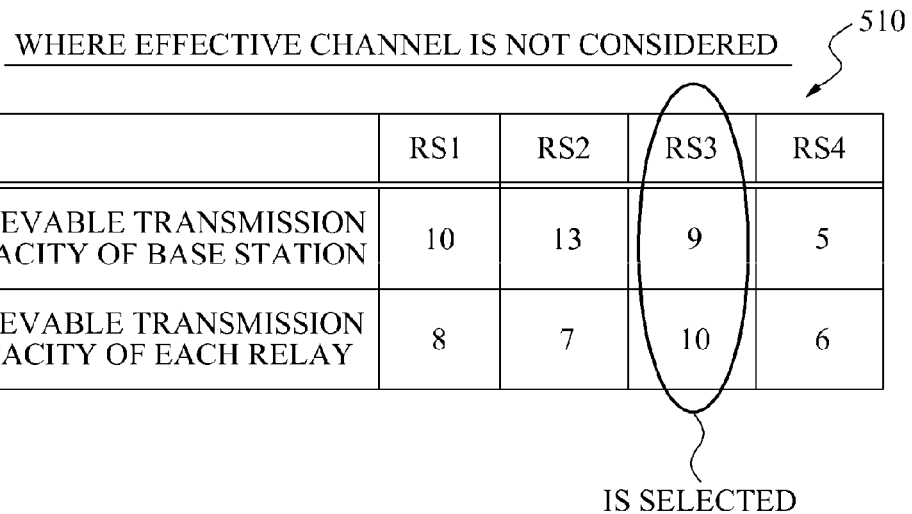
FIG. 5A is a table showing an achievable transmission capacity of an exemplary base station and an achievable transmission capacity of each exemplary relay where an effective channel is not considered.
Figure 5B:
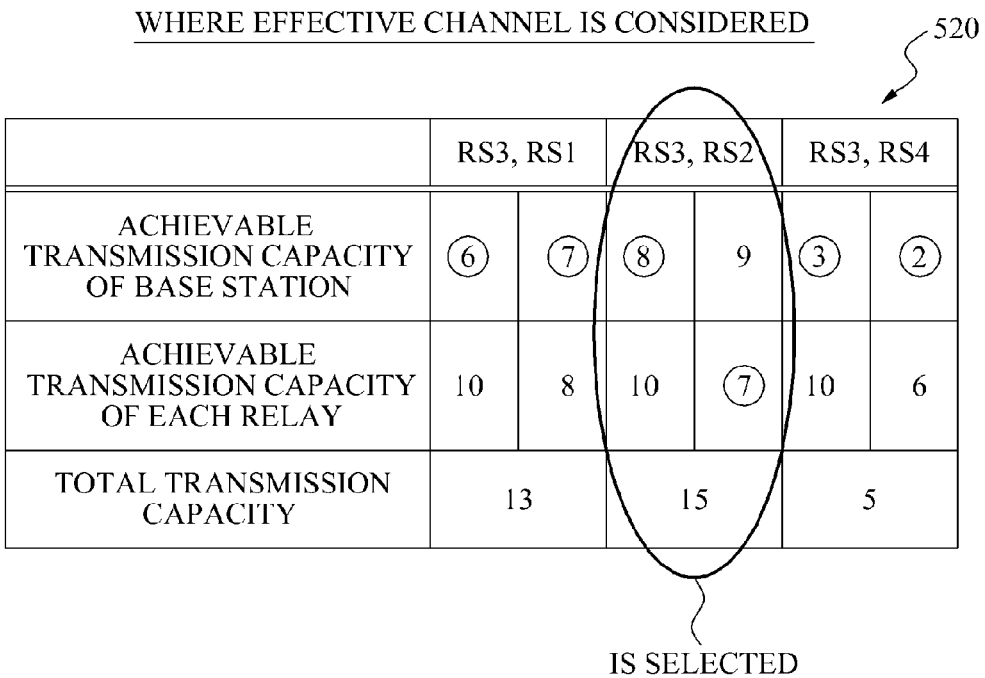
FIG. 5B is a table showing an achievable transmission capacity of an exemplary base station and an achievable transmission capacity of each exemplary relay where an effective channel is considered.

FIGS. 5A and 5B are tables 510 and 520 showing an achievable transmission capacity of an exemplary base station and an achievable transmission capacity of each of relay with respect to an effective channel and a non-effective channel.

Referring to FIG. 5A, the table 510 shows the achievable transmission capacity of the exemplary base station and the achievable transmission capacity of each candidate relays without use of a precoder at the base station.

Referring to the table 510, the base station may calculate its transmission capacity as "10" with respect to a candidate relay RS1 based on a channel formed between the base station and the candidate relay RS1. The base station may calculate its transmission capacity as "13" with respect to a candidate relay RS2 based on a channel formed between the base station and the candidate relay RS2. Similarly, the base station may calculate its transmission capacity as "9" and "5" with respect to candidate relays RS3 and RS4, respectively. Each of the candidate relays (RS1, RS2, RS3, RS4) may calculate its transmission capacity with respect to a user group. For example, the transmission capacity of the candidate relays (RS1, RS2, RS3, RS4) with respect to the user group may be calculated as "8," "7," "10," and "6," respectively.

A total transmission capacity of a path from the base station to the user group via a corresponding candidate relay may be limited by a smaller value between the transmission capacity of the base station and the achievable transmission capacity of the candidate relay. For example, where the achievable transmission capacity of the base station with respect to the candidate relay RS1 is "10" and the achievable transmission capacity of the candidate relay RS1 with respect to the user group is "8," the total transmission capacity may be limited by the achievable transmission capacity "8" of the candidate relay RS1 with respect to the user group. Therefore, the base station may calculate a total transmission capacity corresponding to each candidate relay based on a transmission capacity of the base station and an achievable transmission capacity of each candidate relay. The base station may select, as a tentative serving relay, a candidate relay corresponding to the greatest total transmission capacity.

For example, in the table 510, the base station may select a smaller value between two numerical values in each of four columns. In this example, 8 (=min(10, 8)), 7 (=min(13, 7)), 9 (=min(9, 10)), and 5 (=min(5, 6)) may be selected in four columns of the candidate relays (RS1, RS2, RS3, RS4), respectively. The base station may select, as a tentative serving relay, the candidate relay RS3 corresponding to a maximum value among the selected four values.

Referring to FIG. 5B, the table 520 shows the achievable capacity of the exemplary base station and the achievable transmission capacity of each candidate relay where the base station generates an appropriate precoder based on channels formed between the candidate relays and the base station. Here, it is assumed that two candidate relays are finally selected as serving relays.

The base station may construct a plurality of subsets including the candidate relay RS3 selected as the tentative serving relay. Accordingly, the base station may construct the plurality of subsets (RS3, RS1), (RS3, RS2), and (RS3, RS4). The base station may generate a precoder for each of the subsets (RS3, RS1), (RS3, RS2), and (RS3, RS4) based on channels formed between the base station and the candidate relays (RS1, RS2, RS3, RS4).

Where the precoder is generated for each of the subsets (RS3, RS1), (RS3, RS2), and (RS3, RS4), effective channels between the base station and the subsets (RS3, RS1), (RS3, RS2), and (RS3, RS4) may be calculated. The base station may newly calculate the achievable transmission capacity of the base station with respect to each of the subsets (RS3, RS1), (RS3, RS2), and (RS3, RS4) based on the calculated effective channels.

For example, where the precoder designed for the subset (RS3, RS1) is applied, the transmission capacity of the base station with respect to RS3 and RS1 may be calculated as "6" and "7," respectively. Similarly, in association with the subset (RS3, RS2), the transmission capacity of the base station with respect to RS3 and RS2 may be calculated as "8" and "9," respectively. In association with the subset (RS3, RS4), the transmission capacity of the base station with respect to RS3 and RS4 may be calculated as "3" and "2," respectively.

As described above, the total transmission capacity of the path from the base station to the user group via the candidate relay may be limited by a smaller value between the transmission capacity of the base station and the achievable transmission capacity of the candidate relay. Accordingly, where the precoder for the subset (RS3, RS1) is applied, the total transmission capacity corresponding to RS3 with respect to the path of base station-RS3-user group may be limited to "6." The total transmission capacity corresponding to RS1 with respect to a path of base station-RS1-user group may be limited to "7." Accordingly, where RS3 and RS1 may be selected as the serving relays and the precoder is applied to RS3 and RS1, the system capacity may be predicted to be 6+7="13."

In association with the subset (RS3, RS2), the total transmission capacity corresponding to RS3 with respect to the path of base station-RS3-user group may be limited to "8." The total transmission capacity corresponding to RS2 with respect to the path of base station-RS2-user group may be limited to "7." Accordingly, where RS3 and RS2 are selected as the serving relays and the precoder is applied to RS3 and RS2, the system capacity may be predicted to be 8+7="15."

In association with the subset (RS3, RS4), the total transmission capacity corresponding to RS3 with respect to the path of base station-RS3-user group may be limited to "3." The total transmission capacity corresponding to RS4 with respect to the path of base station-RS4-user group may be limited to "2." Accordingly, where RS3 and RS4 are selected as the serving relays and the precoder is applied to RS3 and RS4, the system capacity may be predicted to be 3+2="5."

The base station may select any one subject from the subsets (RS3, RS1), (RS3, RS2), and (RS3, RS4) so that the system capacity may be maximized. As described above, where RS3 and RS2 are selected as the serving relays and the precoder is applied to RS3 and RS2, the maximum system capacity is 15. Accordingly, the candidate relays (RS2) and (RS3) belonging to the subset (RS3, RS2) may be selected as the serving relays.

Figure 6:
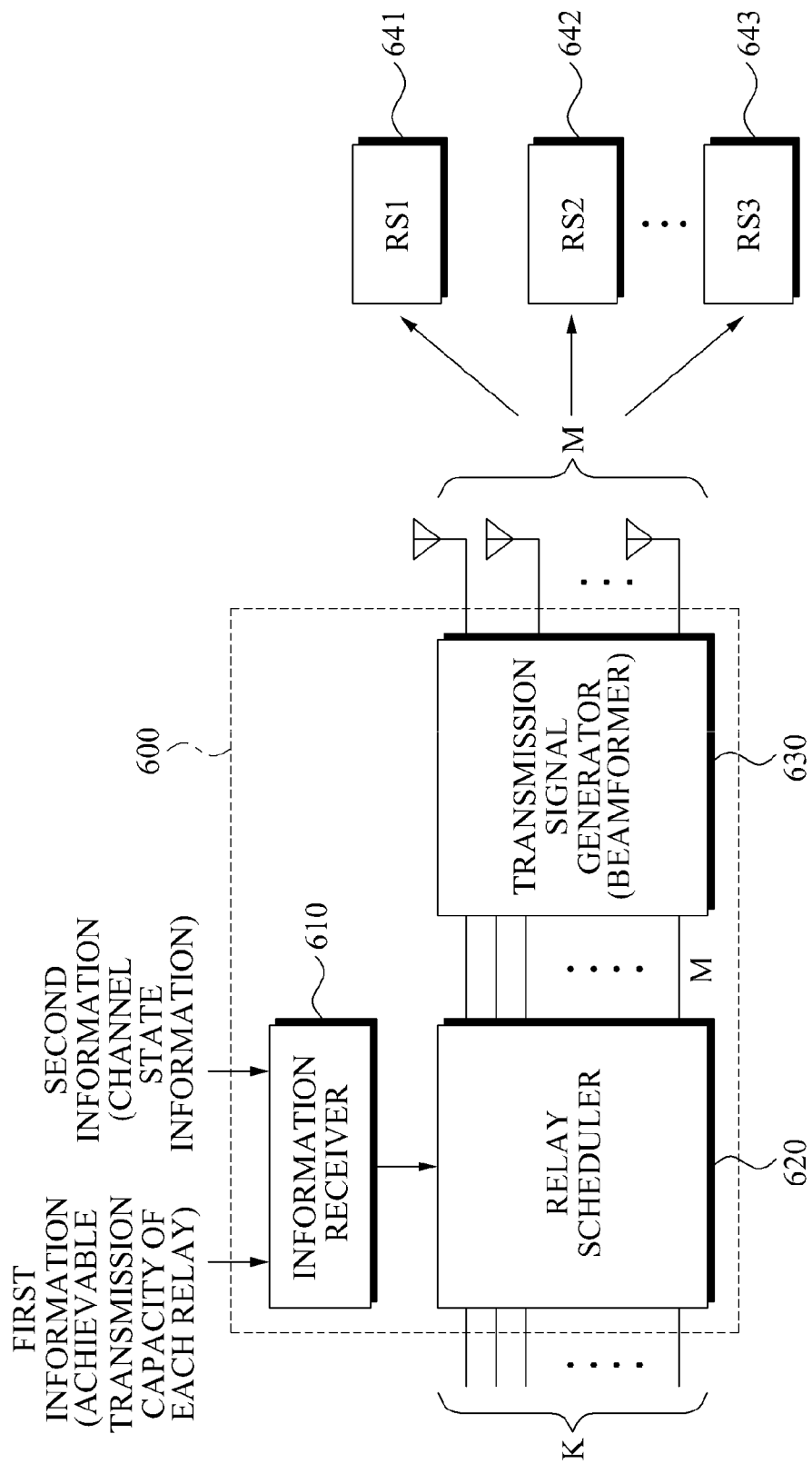
FIG. 6 is a diagram illustrating an exemplary base station installed with multiple antennas.

FIG. 6 illustrates an exemplary base station 600 with multiple antennas installed. The base station 600 may include an information receiver 610, a relay scheduler 620, and a transmission signal generator (e.g., a beamformer) 630.

The information receiver 610 may receive first information associated with an achievable transmission capacity of each candidate relay RS1 641, RS2 642, RS3 643, and second information associated with a state of channels formed between the candidate relays RS1 641, RS2 642, RS3 643, and the base station 600. The second information may correspond to channel state information and thus may include channel quality information and channel direction information.

The relay scheduler 620 may select at least one serving relay from the candidate relays RS1 641, RS2 642, and RS3 643. The relay scheduler 620 may select the at least one serving relay based on a distance between the candidate relays RS1 641, RS2 642, and RS3 643, such that IRI may be reduced and/or eliminated.

The relay scheduler 620 may predict a state of effective channels formed between the candidate relays RS1 641, RS2 642, and RS3 643, and the base station 600, based on an applicable precoder. The relay scheduler 620 may select the at least one serving relay based on the predicted state of effective channels. The relay scheduler 620 may select the at least one serving relay based on the state of effective channels, so that the system capacity may be maximized.

In particular, in order to reduce a complexity, the relay scheduler 620 may construct a plurality of subsets from the plurality of candidate relays RS1 641, RS2 642, and RS3 643 and select any one subset from the plurality of subsets to thereby select the at least one serving relay. For example, theoretically, the system capacity may need to be calculated using $_KC_M$ combinations in order to select M serving relays from K candidate relays. However, in order to reduce a calculation amount, the base station may construct the plurality of subsets and calculate the system capacity with respect to the plurality of subsets and thereby may select any one subset from the plurality of subsets.

Accordingly, data streams corresponding to the M serving relays selected from the K candidate relays may be provided to the transmission signal generator 630.

The transmission signal generator 630 may generate a transmission signal for at least one user group corresponding to the selected at least one serving group. In this example, the transmission signal generator 630 may transmit the transmission signal with respect to the at least one serving relay, according to an SDMA scheme. For example, a zero-forcing beamforming scheme may be used.

Figure 7:
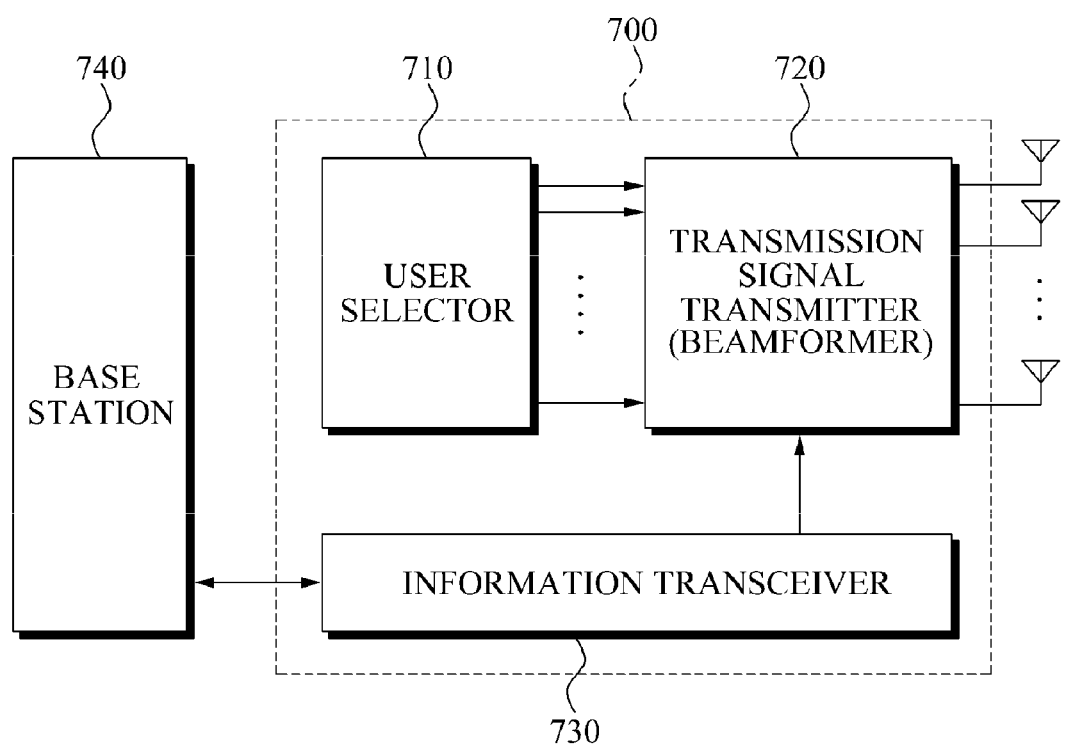
FIG. 7 is a block diagram illustrating an exemplary relay.

FIG. 7 is a block diagram illustrating an exemplary relay 700. The relay 700 may include a user selector 710, a transmission signal transmitter (e.g., a beamformer) 720, and an information transceiver 730.

A base station 740 may select at least one serving relay from a plurality of candidate relays, based on an achievable transmission capacity of each of the candidate relays with respect to at least one user group and a state of channels formed between the plurality of candidate relays and the base station 740. Each of the candidate relays may have a user group including at least one user. Here, it is assumed that the relay 700 is selected as the serving relay.

Information regarding the selection of relay 700 as the serving relay may be fed back to the relay 700 via the information transceiver 730. Information associated with an achievable transmission capacity of a target relay with respect to a selected at least one user may be fed back to the base station 740 via the information transceiver 730.

The user selector 710 may select at least one user from a plurality of users according to a greedy user selection algorithm and the like.

The relay signal transmitter 720 may transmit a relay signal to the selected at least one user. Where the relay 700 is not selected as the serving relay, the relay signal may not be generated.

The relay signal transmitter 720 may generate the relay signal using a decode-and-forward scheme or an amplify-and-forward scheme, for example, based on the transmission signal of the base station 740. The relay signal transmitter 720 may use an SDMA scheme.

Figure 8:
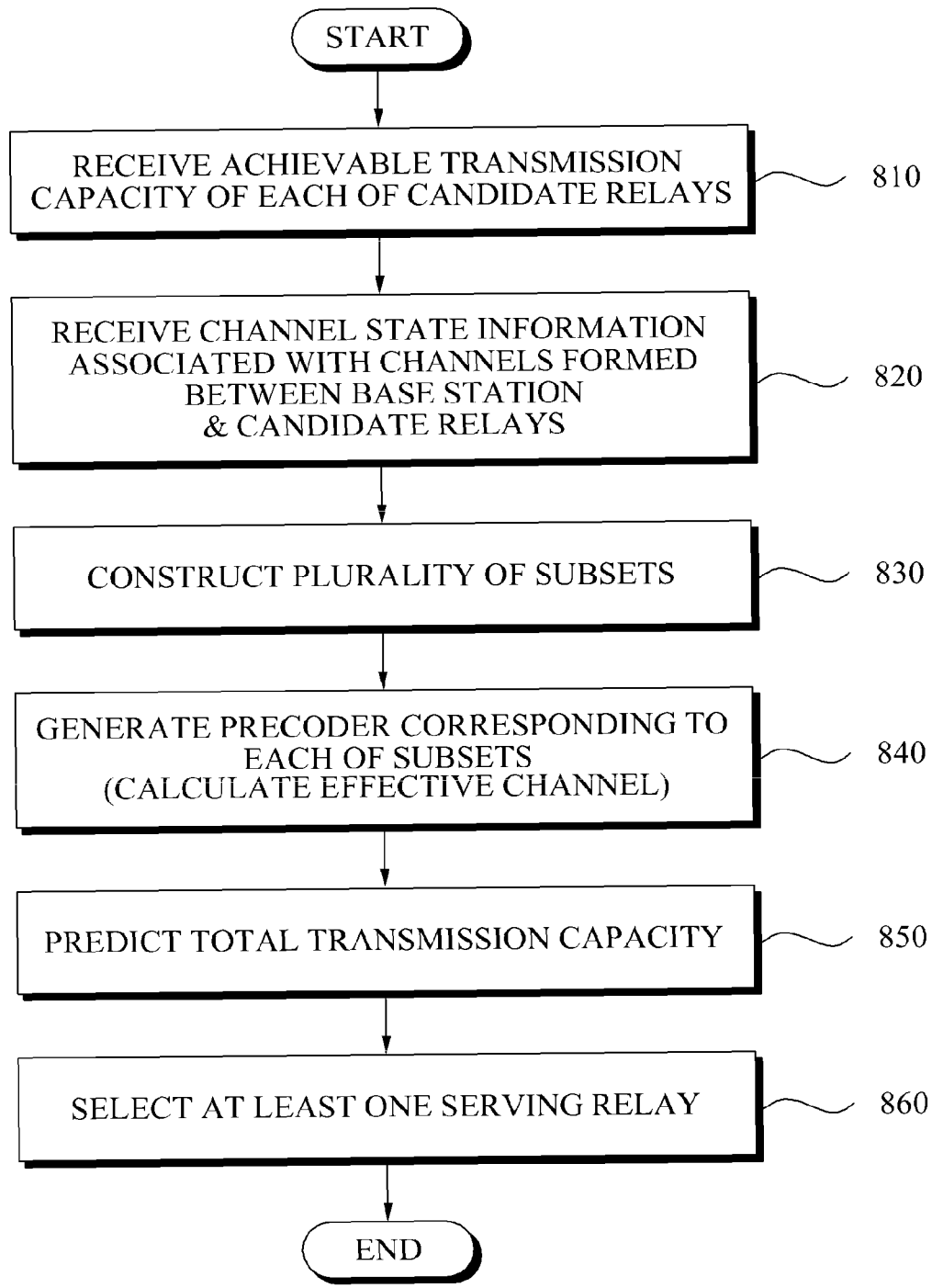
FIG. 8 is a flowchart illustrating an exemplary method of operating a base station.

FIG. 8 illustrates an exemplary method of operating a base station The base station may receive an achievable transmission capacity of a plurality of candidate relays (810).

The base station may receive channel state information associated with channels formed between the base station and the candidate relays (820).

The base station may construct a plurality of subsets from the plurality of candidate relays (830).

The base station may generate a precoder corresponding to each of the subsets (840). Effective channels of candidate relays belonging to each of the subsets may be calculated based on the precoder.

The base station may predict a total transmission capacity of a path from the base station to a user group via a candidate relay with respect to each candidate relay (850).

The base station may select any one subset from the plurality of subsets, so that a system capacity (i.e., a sum of total transmission capacities) may be maximized and thereby may select the at least one serving relay.

The above-described methods may be recorded, stored, or fixed in one or more computer-readable media that includes program instructions to be implemented by a computer to cause a processor to execute or perform the program instructions. The media also may include, independently or in combination with the program, instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and/or methods described above.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station including multiple antennas comprising:
    a relay scheduler to select a serving relay from a plurality of candidate relays, each candidate relay having a user group including at least one user, where the selection is based on an achievable transmission capacity of each candidate relay with respect to its user group and a state of channels formed between the plurality of candidate relays and the base station; and
    a transmission signal generator to generate a transmission signal for the user group corresponding to the serving relay,
    wherein the relay scheduler, the transmission signal generator, or any combination thereof is implemented by a processor.

2. The base station of claim 1, wherein the relay scheduler selects the serving relay based on inter-relay interference (IRI) occurring in the user group of each candidate relay due to the plurality of candidate relays.

3. The base station of claim 1, wherein the selection of the serving relay is based on a prediction of a state of effective channels formed between the plurality of candidate relays and the base station based on the state of channels formed between the plurality of candidate relays and the base station.

4. The base station of claim 3, wherein the selection of the serving relay is based on an achievable transmission capacity of the base station with respect to the plurality of candidate relays and the predicated state of the effective channels.

5. The base station of claim 1, wherein the relay scheduler predicts a total transmission capacity corresponding to the serving relay based on a lesser value between an achievable transmission capacity of the base station with respect to the serving relay and a transmission capacity of the serving relay with respect to its user group, and the relay scheduler selects the serving relay that maximizes a system capacity, where the system capacity is a sum of total transmission capacities corresponding to the serving relay.

6. The base station of claim 3, wherein the relay scheduler predicts the state of effective channels, based on the state of channels formed between the plurality of candidate relays and the base station, and the relay scheduler generates a precoder.

7. The base station of claim 2, wherein the relay scheduler selects the serving relay by constructing a plurality of subsets from the plurality of candidate relays and selects any one subset from the plurality of subsets to thereby select the serving relay.

8. The base station of claim 2, wherein the relay scheduler selects the serving relay by constructing a plurality of subsets from the plurality of candidate relays, groups the plurality of subsets based on locations of candidate relays, and each of the subsets comprises the same single relay.

9. The base station of claim 2, wherein the relay scheduler selects the serving relay by constructing a plurality of subsets from the plurality of candidate relays and selects any one subset from the plurality of subsets based on an achievable transmission capacity of the base station with respect to candidate relays belonging to the plurality of subsets and an achievable transmission capacity of each candidate relay belonging to the plurality of subsets and its user group.

10. The base station of claim 1, wherein the transmission signal is transmitted to the serving relay in a first time slot and the a relay signal associated with the transmission signal is configured to be transmitted to the user group of each candidate relay in a second time slot different from the first time slot.

11. The base station of claim 1, wherein each candidate relay selects the user based on its achievable transmission capacity to construct its user group.

12. The base station of claim 1, wherein the transmission signal generator generates the transmission signal with respect to the serving relay according to a spatial division multiplexing access (SDMA) scheme.

13. The base station of claim 1, wherein the transmission signal generator generates the transmission signal according to a zero-forcing beamforming scheme.

14. The base station of claim 1, further comprising:
    an information receiver to receive first information associated with the transmission capacity of each candidate relay and second information associated with a state of channels formed between the plurality of candidate relays and the base station.

15. A relay comprising:
    a user selector to select a user from a plurality of users;
    an information transceiver to transmit, to a base station, information associated with an achievable transmission capacity of with respect to the selected user and channel state information associated with a channel formed between the base station and the relay, and to receive information associated with at least one serving relay; and
    a relay signal transmitter to transmit a relay signal to the selected user when the relay is selected as the at least one serving relay by the base station,
    wherein the relay is selected as the serving relay from a plurality of candidate relays, based on an achievable transmission capacity of each candidate relay with respect to its user group and a state of channels formed between the plurality of candidate relays and the base station, and the user group of each candidate relay includes the user.

16. The relay of claim 15, wherein the user selector selects the user based on a state of channels formed between the relay and the plurality of users.

17. The relay of claim 15, wherein the relay signal transmitter transmits the relay signal according to an SDMA scheme.

18. The relay of claim 15, wherein a state of effective channels formed between the plurality of candidate relays and the base station is predicted based on the state of channels formed between the plurality of candidate relays and the base station and the relay is selected as the at least one serving relay based on the predicted state of effective channels.

19. A method of operating a base station including multiple antennas, the method comprising:
    selecting at least one serving relay from a plurality of candidate relays, each candidate relay having a user group including at least one user, based on an achievable transmission capacity of each candidate relay with respect to at least one user group and a state of channels formed between the plurality of candidate relays and the base station; and
    generating a transmission signal for the user group corresponding to the at least one serving relay,
    wherein the selecting operation, the generating operation, or any combination thereof is implemented by a processor.

20. A non-transitory computer-readable recording medium storing a program configured to cause a base station including multiple antennas to:
    select at least one serving relay from a plurality of candidate relays, each candidate relay having a user group including at least one user, based on an achievable transmission capacity of each candidate relay with respect to at least one user group and a state of channels formed between the plurality of candidate relays and the base station; and
    generate a transmission signal for the user group corresponding to the at least one serving relay.

* * * * *